US012687519B2

(12) United States Patent (10) Patent No.: US 12,687,519 B2

Jandaud et al. (45) Date of Patent: Jul. 21, 2026

(54) DUAL-GAS METERING SYSTEM AND METHOD

(71) Applicant: Itron, Inc., Liberty Lake, WA (US)

(72) Inventors: Pierre-Olivier Jandaud, Macon (FR); Karsten Hugler, Woerth (DE); Thibaut Meurisse, Macon (FR)

(73) Assignee: Itron, Inc., Liberty Lake, WA (US)

( * ) Notice: Subject to any disclaimer, the term of this patent is extended or adjusted under 35 U.S.C. 154(b) by 296 days.

(21) Appl. No.: 18/521,522

(22) Filed: Nov. 28, 2023

(65) Prior Publication Data

US 2025/0172526 A1 May 29, 2025

(51) Int. Cl.
| | |
|---|---|
| *G01N 29/024* | (2006.01) |
| *F17D 5/00* | (2006.01) |
| *G01N 29/44* | (2006.01) |

(52) U.S. Cl.
CPC ........... *G01N 29/024* (2013.01); *F17D 5/005* (2013.01); *G01N 29/4427* (2013.01); *G01N 2291/0212* (2013.01); *G01N 2291/02809* (2013.01)

(58) Field of Classification Search
CPC ............. G01N 29/024; G01N 29/4427; G01N 2291/0212; G01N 2291/02809; F17D 5/005
See application file for complete search history.

(56) References Cited

U.S. PATENT DOCUMENTS

| | | | |
|---|---|---|---|
| 2020/0049676 A1* | 2/2020 | Ye | G01N 29/036 |
| 2025/0052379 A1* | 2/2025 | Thobe | B01F 35/2132 |

FOREIGN PATENT DOCUMENTS

WO WO2022133610 A1 6/2022

OTHER PUBLICATIONS

"Gas quality measurement of gas mixtures containing hydrogen with ultrasonic flow meters—experiences, challenges and perspectives", by Ullmann, see attached publication (Year: 2022).*
Guandalini, et al., "Dynamic modeling of natural gas quality within transport pipelines in presence of hydrogen injections", Applied Energy, Elsevier, vol. 185, Mar. 24, 2016, pp. 1712-1723.
Search Report and Written Opinion for International Application No. PCT/US2024/49337, Dated Jan. 9, 2025, 13 pages.

* cited by examiner

*Primary Examiner* — Xin Y Zhong

(74) *Attorney, Agent, or Firm* — Lee & Hayes, P.C.

(57) ABSTRACT

A dual-gas metering system and method is described herein, wherein percentages of two types of gas in a gas flow are determined. The system uses two speed of sound measurements, and calculates a percentage of hydrogen gas within a mixture of natural gas and hydrogen gas. In a further example, a first speed of sound within a single type of gas (e.g., natural gas) is obtained. This measurement may be obtained from a remote device operating in a region of the gas system upstream of a location wherein a second type of gas (e.g., hydrogen gas) is introduced. A second speed of sound within a dual-gas mixture is measured. A hydrogen concentration value is calculated based at least in part on the first speed of sound and the second speed of sound, such as by using a ratio of the two speeds of sound and a lookup table.

18 Claims, 8 Drawing Sheets

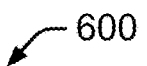

510
CALCULATE A HYDROGEN CONCENTRATION BASED AT LEAST IN PART ON THE FIRST SPEED OF SOUND AND THE SECOND SPEED OF SOUND

602
CALCULATE A RELATIVE SPEED OF SOUND, BASED ON THE FIRST SPEED OF SOUND AND THE SECOND SPEED OF SOUND

604
CALCULATE THE RELATIVE SPEED OF SOUND AS A QUOTIENT OF THE FIRST SPEED OF SOUND AND THE SECOND SPEED OF SOUND

606
USE A LOOKUP TABLE TO MAP THE RELATIVE SPEED OF SOUND TO THE HYDROGEN CONCENTRATION

608
USE A FORMULA TO MAP THE RELATIVE SPEED OF SOUND TO THE HYDROGEN CONCENTRATION

FIG. 6

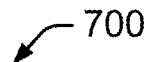
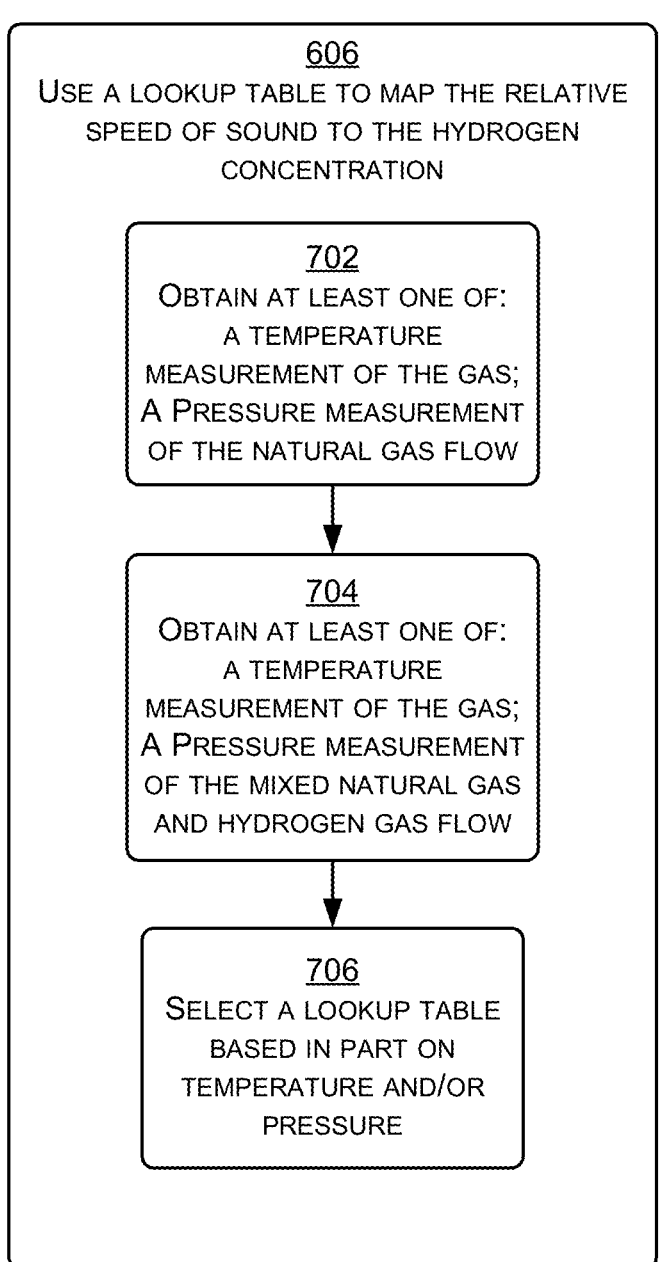
FIG. 7

DUAL-GAS METERING SYSTEM AND METHOD

BACKGROUND

Gas meters are used in residential, commercial, industrial, and other sites to measure the flow of natural gas, and in some instances propane, or other gas. A mixture of gases-such as natural gas and hydrogen gas-presents a problem for such meters. This is particularly true when the energy values of the two gases are different.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 6 is a flow diagram showing an example method by which a calculation of a hydrogen concentration may be performed.

FIG. 7 is a flow diagram showing an example method by which a lookup table can be selected.

DETAILED DESCRIPTION

Overview

Techniques are described for the operation of a dual-gas metering device at a site of a residential, commercial, industrial, or other gas customer. In an example, a dual-gas metering device measures an overall quantity of two gases, as well as a ratio of the two gases. In some examples, the dual-gas metering device may measure a gas mixture comprising natural gas and hydrogen gas. (Natural gas is typically a mixture of methane (e.g., 80% or more), along with propane, butane, carbon dioxide, and/or other gases.) In the example, the ratio may indicate respective quantities of natural gas and hydrogen gas. The ratio may indicate a percentage of each gas within a gas flow.

In an example of a dual-gas metering system, a metering device at a customer site is configured to determine the hydrogen concentration in a gas flow that may include natural gas. The hydrogen gas concentration is calculated to thereby determine the energy content of the measured gas mixture and the appropriate charge to the customer.

In the example, a value of a first speed of sound of a first gas is obtained by the metering device. The value for the first speed of sound may be measured by a remote device that is in data communication with the metering device. For example, the remote device may be upstream of a location at which hydrogen gas is injected into a gas main. Accordingly, the remote device measures the speed of sound in natural gas before hydrogen gas is added to the natural gas flow. The metering device may measure a second speed of sound of the dual-gas supplied to the customer site. Accordingly, a first speed of sound is measured within a natural gas flow, and a second speed of sound is measured within a mixture of natural gas and hydrogen gas. The gas metering device is then able to calculate a ratio of the hydrogen gas to natural gas. The calculation is based at least in part on the first speed of sound and the second speed of sound.

In an example of the calculation, a relative speed of sound formed by a ratio or quotient of the first speed of sound and the second speed of sound is calculated. The hydrogen concentration is based on the relative speed of sound. In an example, the relative speed of sound is entered into a lookup table (or other data management device or tool) to obtain the hydrogen concentration. In some examples, an appropriate lookup table is selected based on gas temperature and/or pressure at either or both of the locations at which a speed of sound was measured.

Example Systems and Techniques

Figure 1:
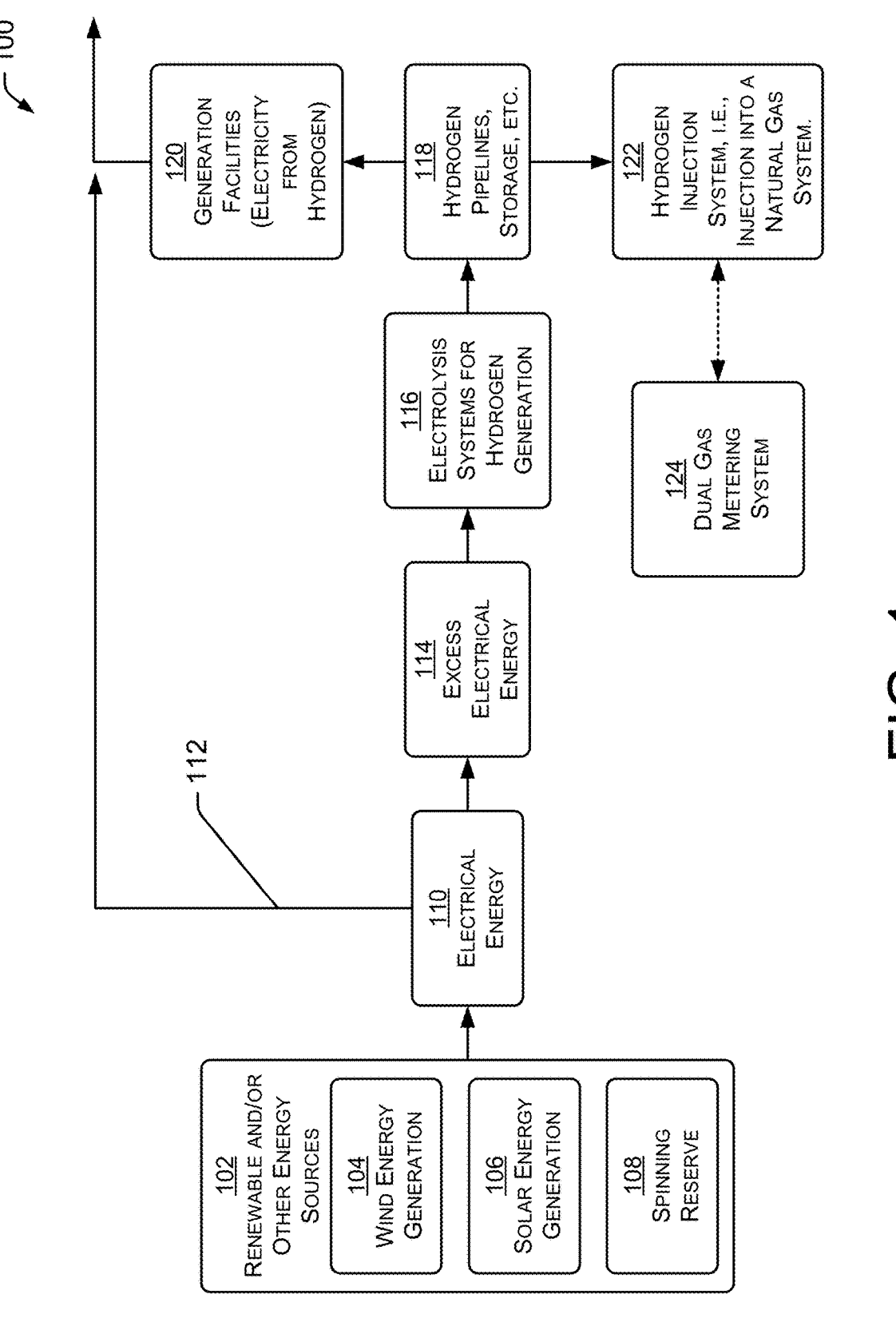
FIG. 1 is block diagram showing an example electricity grid, wherein hydrogen generation is used to store energy for subsequent use.

FIG. 1 shows a portion of an example electricity grid 100 including features of a dual-gas metering system and method. The example electricity grid 100 shows systems and methods to generate hydrogen gas which may be utilized to generate electricity at a later time and/or which may be injected into a gas delivery system (e.g., a natural gas delivery system). In the example electricity grid 100, renewable energy sources 102 may include wind energy generation 104, solar energy generation 106, and/or spinning reserve 108. The spinning reserve 108 may include any electricity that is generated that is beyond the current needs of the customers of the electricity grid 100. The spinning reserve 108 may be produced by gas turbines, water turbines, etc., and is generally required to avoid low voltage conditions should demand increase more quickly than supply would otherwise be able to respond. In an example, the production of hydrogen gas may be immediately suspended to divert the electricity used for electrolysis to supply customers.

Electrical power and/or energy 110 may be created by the energy sources 102 and/or other generating facilities. Electricity 112 that is currently required is directed to customers, while excess electrical energy 114 is directed to electrolysis systems 116 for hydrogen generation. The hydrogen generated by such systems is transferred to pipelines and/or storage tanks 118.

The hydrogen pipelines and/or storage tanks 118 may deliver hydrogen to generation facilities 120, which create electrical power. Accordingly, some of the excess electrical energy 114 is used to generate hydrogen, which is used to create electricity at a later time. Additionally and/or alternatively, a hydrogen injection system 122 injects hydrogen gas into a natural gas delivery system.

With the addition of the hydrogen injection system 122, a natural gas delivery system becomes a dual-gas delivery system. The hydrogen gas may be introduced into the gas delivery system in one or more locations, at different rates, for different periods of time. Accordingly, the gas flow within the system does not contain uniform percentages of constituent gases, thereby creating a need for a dual-gas metering system 124.

The dual-gas metering system 124 is configured to determine (with periodic and/or continuous updating) the percentages of two different gases that are delivered to each customer. In an example, each period of time (e.g., a second or a minute) a customer may receive an overall volume of gas, which represents two constituent volumes of gas (e.g., a volume of natural gas and a volume of hydrogen gas). Accordingly, the dual-gas metering system 124 determines a percentage of the volume (or other unit of measure) of each gas over a period of time. This allows each customer to be billed an appropriate amount, based on the energy value of the gas mixture.

Figure 2:
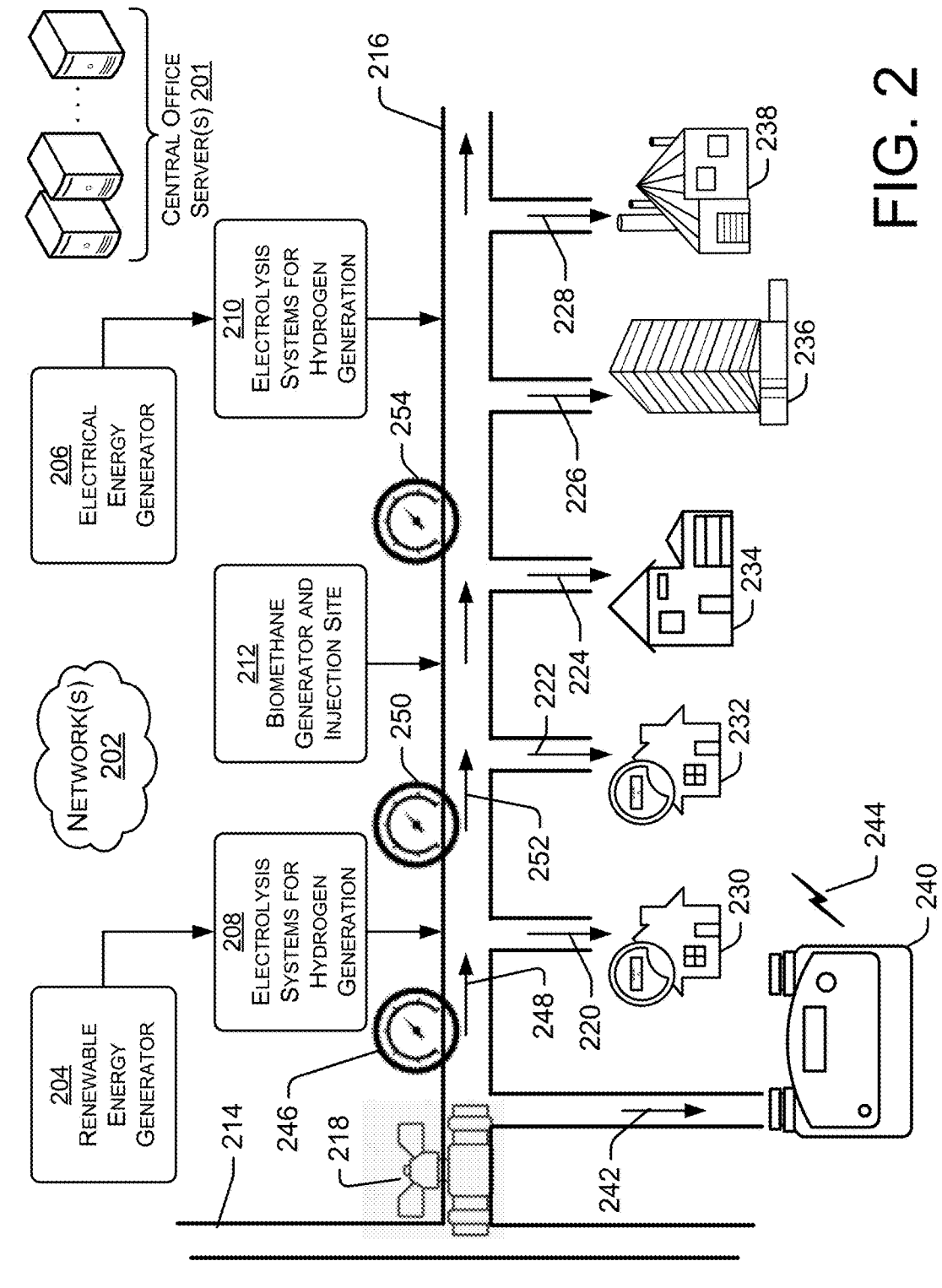
FIG. 2 is a block diagram showing an example gas delivery system having a mixture of gases delivered to one or more customers.

FIG. 2 shows an example gas delivery system 200 that delivers a mixture of gases to one or more customers. One or more servers from among central office server(s) 201 include one or more digital processors, one or more memory device(s), and software defined on the memory device(s) that is executable by the processor(s). The central office server(s) 201 communicate over network(s) 202, which may include the internet and/or proprietary networks of an electrical grid and/or gas delivery infrastructure. In an example, the central office server(s) 201 control and/or communicate with a renewable energy generator 204 and/or an electrical energy generator 206. The renewable energy generator 204 may utilize wind, hydro, solar, biofuels, geothermal, or other energy sources to generate electricity. The electrical energy generator 206 may utilize conventional energy sources, such as natural gas, coal, nuclear, etc., to generate electricity.

The renewable energy generator 204 and electrical energy generator 206 may be connected to one or more electrolysis systems 208, 210 for generation of hydrogen gas. Upon generation, the hydrogen gas may be stored (e.g., in facilities such as pipelines and/or storage tanks 118 of FIG. 1) or injected into a main or spur of a natural gas delivery system.

A biomethane generator and injection site 212 is configured to add natural gas to the gas flow. Accordingly, the percentages of hydrogen and natural gas may be different in different areas of the gas delivery system 200.

The natural gas delivery system 200 may include one or more backbone gas main(s) 214 and one or more branch gas main(s) 216. The backbone gas main(s) 214 typically transport natural gas, but may transport a mixture of natural gas and hydrogen gas. In the example, a valve 218 may be used to turn off gas manually or automatically to any of the branch main(s) 216. A plurality of gas spur lines 220-228 provide gas to respective customers 230-238. The customers may include single-family residences 230, 232, multifamily residence 234, commercial high-rise offices and/or condominiums 236, and/or large commercial or industrial facilities 238.

A gas meter 240 is representative of gas meters used at customer sites 230-238. The gas meter 240 includes one or more digital processors, one or more memory device(s), and software defined on the memory device(s) that is executable by the processor(s). The gas meter 240 is configured to receive a gas flow 242 to measure the respective size of constituent gas flows, such as respective percentage by volume of natural gas and hydrogen. Information regarding gas flowrates, volumes, respective volumes of natural gas and hydrogen, gas temperature, etc., can be sent to the central office 201 and/or other gas meters (e.g., associated with customers 230-238) by means of communications signal 244 and one or more network(s) 202.

A metering device 246 measures a speed of sound of gas 248 flowing upstream of the electrolysis system 208. This measurement provides one speed of sound measurement (within natural gas) used to calculate the hydrogen concentration. Similarly, the metering device 250 measures a speed of sound of gas flow 252 containing hydrogen from the electrolysis system 208. Additional metering devices could be installed after the biomethane generator 212 and after the electrolysis system 210. Accordingly, the metering devices obtain speeds of sound before and after changes in gas percentages within the mixture of the gas flows. In an example, the speeds of sound measured by metering devices 246 (speed of sound in natural gas) and 250 (speed of sound in a mixture of natural gas and hydrogen gas) could be used to determine a relative speed of sound at residence 232. If metering device 250 was not present, the second measurement of the speed of sound in a dual-gas mixture could be performed locally by a gas meter at residence 232. A metering device 254 is positioned downstream of the biomethane generator 212, and will reflect the higher natural gas concentration resulting from the generator.

Example Techniques

Figure 3:
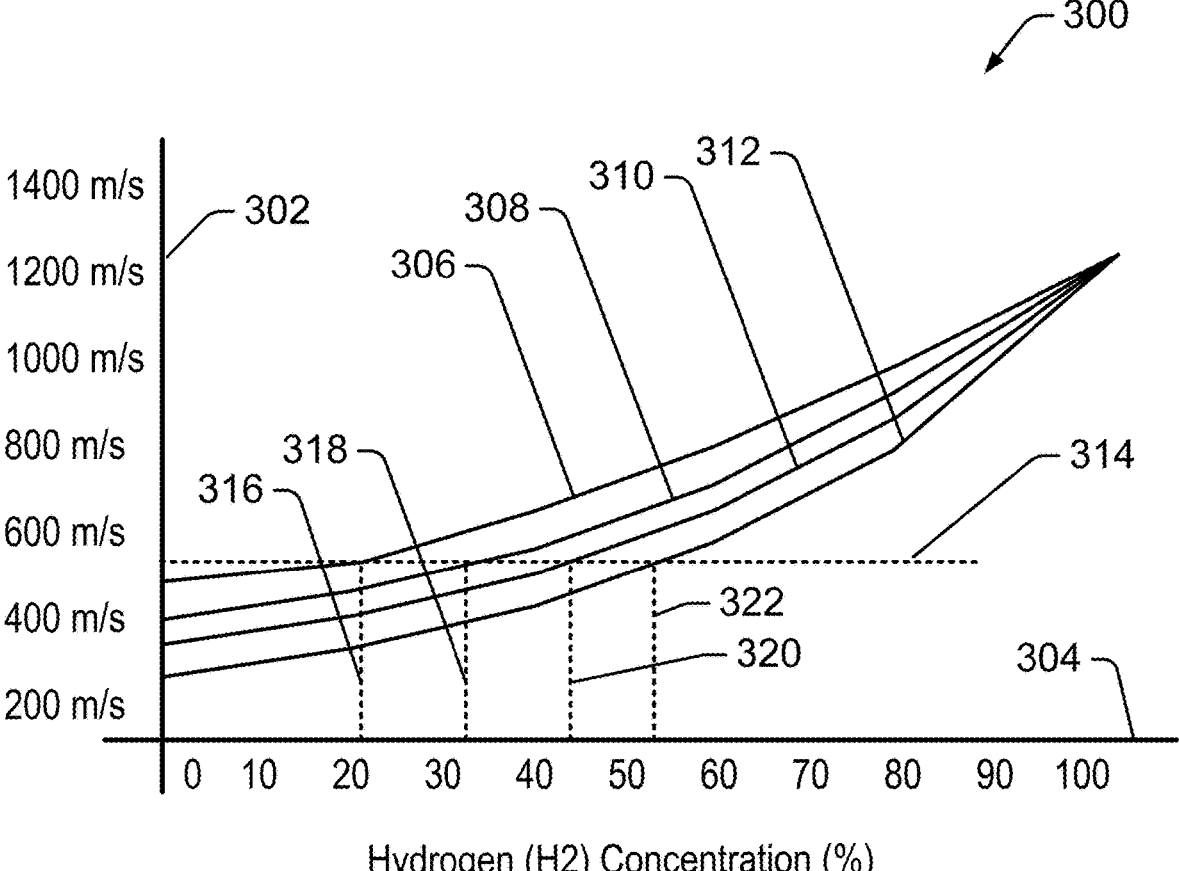
FIG. 3 is a graph showing that measurement of the speed of sound of a gas mixture at a gas metering device is not sufficient to correctly determine the hydrogen content within a gas flow and/or a ratio of a combination of gases within the gas flow.

FIG. 3 shows a graphical relationship 300 between the speed of sound within a mixture of gases and the hydrogen concentration within the mixture. On the vertical axis 302 the speed of sound in the mixture of gas is shown in meters per second. On the horizontal axis 304 the concentration of hydrogen gas within the mixture of hydrogen and natural gas is expressed as a percentage.

Curves 306-312 show the speed of sound in gases having four different ratios of natural gas and hydrogen. Selecting a somewhat arbitrary speed of sound 314, it can be seen that the four different mixtures of natural gas and hydrogen gas 306-312 have four different percentages of hydrogen 316-322. Accordingly, the speed of sound moving through a mixture of natural gas and hydrogen gases fails to show the ratio of the two gases. That is, a single speed of sound is associated with four different mixtures of natural gas and hydrogen gas, making the relationship 300 useless.

Figure 4:
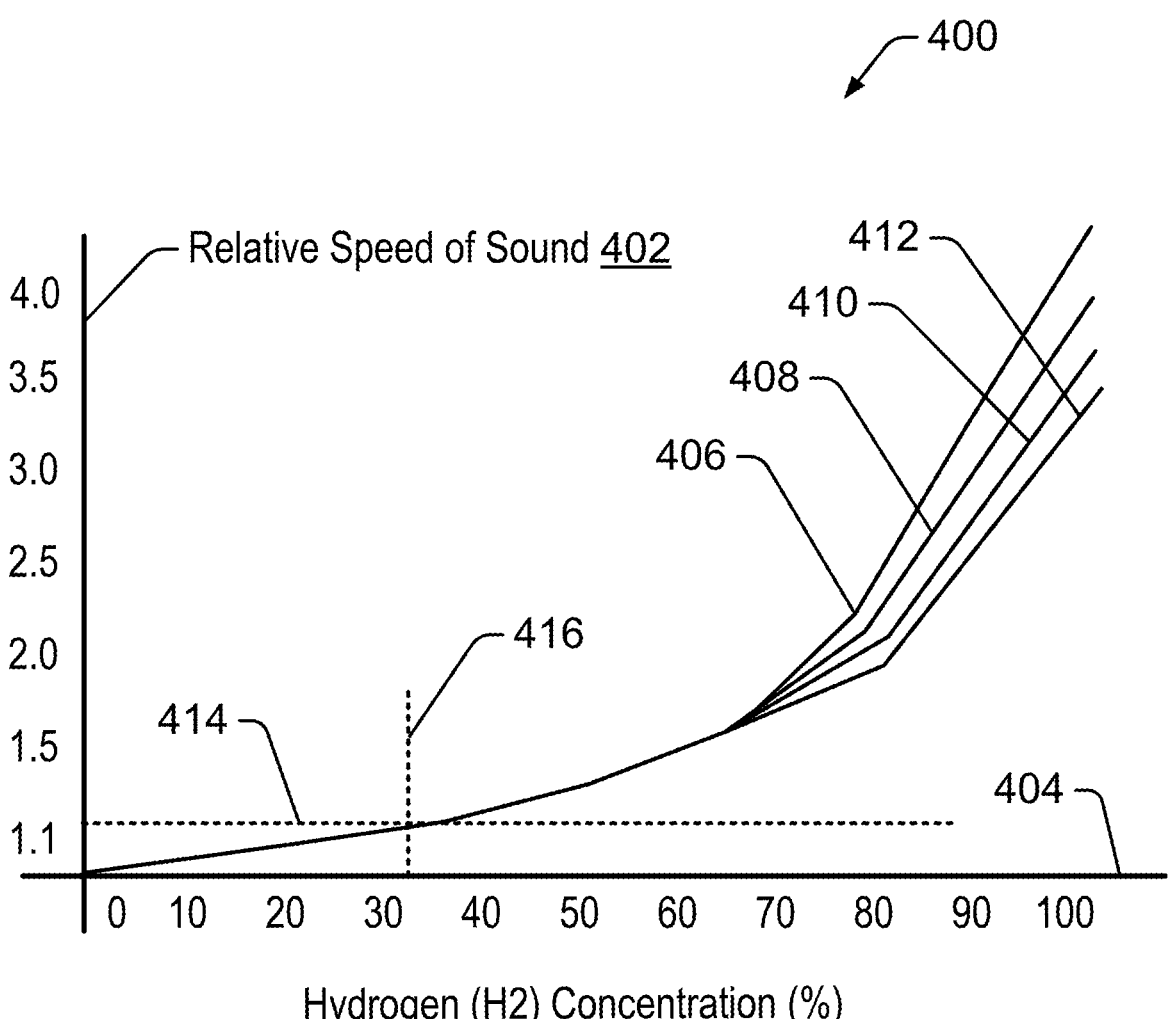
FIG. 4 is a graph showing that measurement of a first speed of sound of a first gas and a second speed of sound of a gas mixture including the first gas and a second gas can be used to determine a ratio of the first and second gases within the gas mixture.

FIG. 4 shows a graphical relationship 400 depicting techniques that use the speed of sound moving through natural gas, together with the speed of sound moving through the mixture of natural gas and hydrogen, to obtain the percentage of hydrogen gas. On the vertical axis 402 the "relative" speed of sound is shown in meters per second. The relative speed of sound may be a relationship between the speed of sound in natural gas divided by the speed of sound in a mixture of natural gas and hydrogen gas (or the reverse or reciprocal of that quotient). The relative speed of sound could be other functions, relationships, equations, etc., that use as input the two speeds of sound. On the horizontal axis 404 the concentration of hydrogen gas within a mixture of hydrogen and natural gas is expressed as a percentage.

Curves 406-412 show the speed of sound in gases having four different ratios of natural gas and hydrogen gases. Significantly, the curves are substantially overlapping for hydrogen gas concentrations that are less than 70 percent. This area of overlap provides a region of hydrogen concentrations that are a function of the relative speed of sound.

To better understand the relative speed of sound indicated by axis 402, the speed of sound in natural gas is measured before the hydrogen gas is introduced. The measurement may take place at a metering device that is upstream of a location at which hydrogen is introduced. The speed of sound of the mixture (natural gas and hydrogen gas) is measured, typically at a metering device of the customer. The quotient (or other function) of the speed of sound of the natural gas (e.g., measured by an upstream device) divided by the speed of sound of the mixture (e.g., a natural gas and hydrogen gas mixture measured by the metering device) is the "relative speed of sound."

In the example of FIG. 4 the relative speed of sound indicated at 414 is approximately 1.1 on the vertical axis 402 (i.e., the quotient of either speed of sound divided by the other, as described above, is approximately 1.1). The relative speed of sound 414 is associated with an approximately 30% concentration of hydrogen gas in the mixture (by volume) seen at 416 on the horizontal axis 404. Significantly, the relative speed of sound is associated with only one value of hydrogen concentration. While FIG. 4 is shown in a graphical manner for ease of understanding, a function, look-up table, or other data structure could be used by software in calculating the hydrogen concentration.

Example Methods

In some examples, the techniques discussed herein may be implemented by one more processors accessing software defined on one or more memory devices. The processor(s) and memory device(s) may be located on a smart gas meter (e.g., smart gas meters associated with customers 230-238 of FIG. 2), a gas meter or other device upstream of the hydrogen injection site (e.g., gas meter 240 of FIG. 2), a metering device 246, 250, 254 associated with a gas flow, and/or a cloud-based server (e.g., server 201 of a utility company). If the functionality is distributed, software may reside on both the smart gas meter(s) and the server.

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory devices of the central office server(s) and/or one or more metering devices or other networked devices may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase-change memory (PRAM), static random-access memory (SRAM), dynamic random-access memory (DRAM), other types of random access memory (RAM), read-only memory (ROM), electrically erasable programmable read-only memory (EE-PROM), programmable read-only memory (PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media. Computer-readable media does not include transitory media, such as modulated data signals and carrier waves, and/or other information-containing signals.

Figure 5:
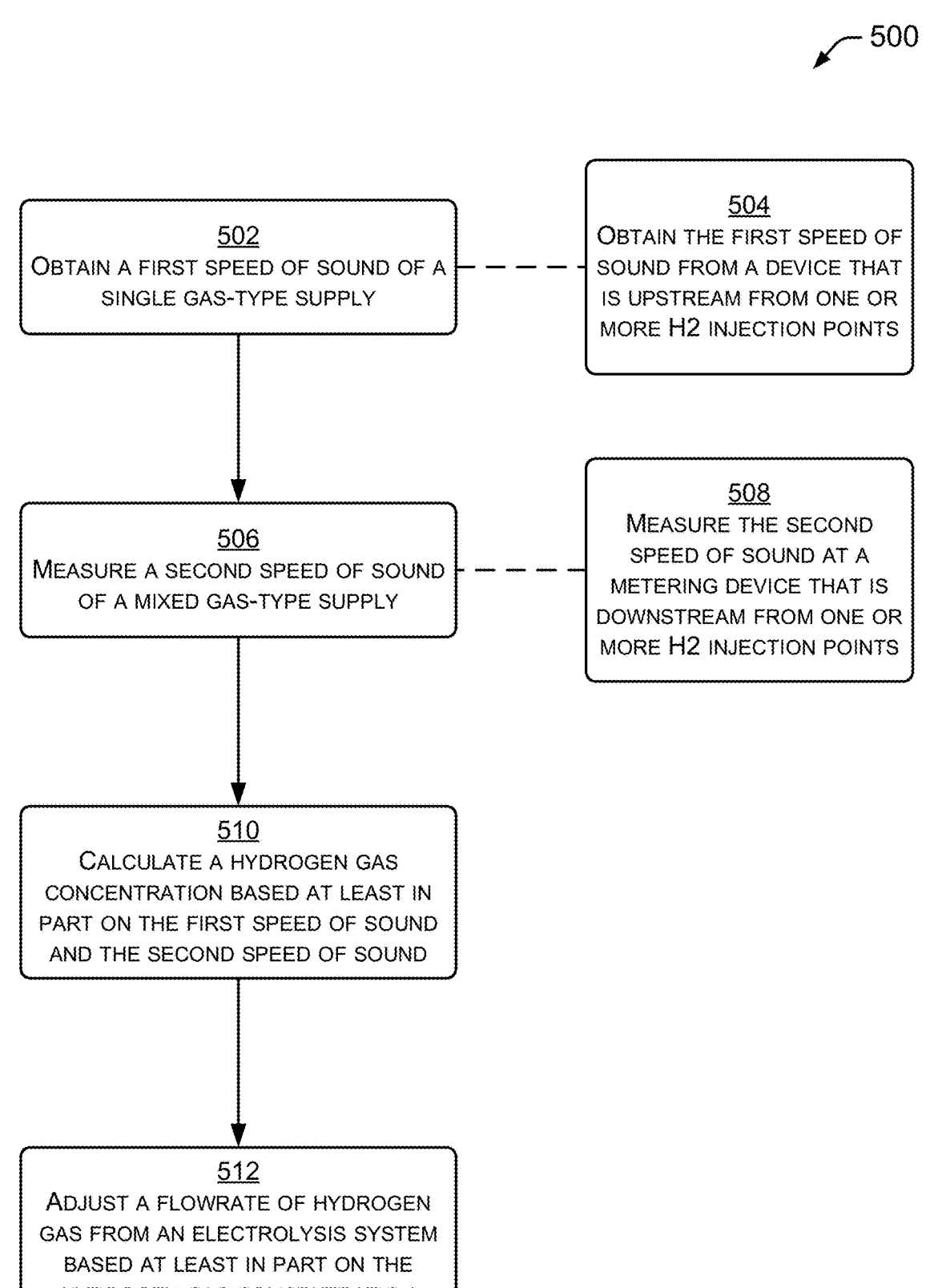
FIG. 5 is a flow diagram showing an example method by which a ratio of a mixture of gases may be determined.

FIG. 5 shows an example method 500 by which a ratio of a mixture of gases may be determined. The determination may be made during gas flow conditions, such as within gas metering devices. In the example, a first speed of sound within a single gas supply (e.g., natural gas) is obtained. This may be measured by a device that is upstream of a location at which hydrogen is introduced into the natural gas supply system. A second speed of sound is measured of a dual-gas supply (e.g., natural gas and hydrogen gas). This may be measured by a metering device that is at a customer's location. The hydrogen concentration may then be calculated based at least in part on input including the first speed of sound and the second speed of sound. For example, a ratio of the two speeds may be calculated, and the hydrogen concentration may be obtained by operation of a lookup table or formula using the ratio as input. While FIG. 5 describes example locations wherein calculations are made, the calculations may be made at any location, including a metering device, a data collector, a utility office server, etc.

At block 502, a value of a first speed of sound is obtained. The first speed of sound may be within a single type of gas (e.g., natural gas). The value may be obtained by (but not measured by) a metering device that is associated with a customer, such as a customer of a dual-gas supply (e.g., natural gas and hydrogen gas). Since the gas supplied to a customer is mixed, it may be necessary to obtain the value of the first speed of sound from an upstream location, i.e., a measurement may be made at a location upstream of a location at which hydrogen gas was injected into the gas delivery system. The value of the first speed of sound within a single gas may be obtained over a network, such as the internet and/or a proprietary utility company data transmission network. In the further example of block 504, the first speed of sound is obtained from a device that performed the measurement at a location upstream from one or more hydrogen gas injection points. This device may be in communication with the internet and/or the proprietary utility company communications network, and may forward speed of sound information to the metering device at the customer site.

In an alternative, artificial intelligence (AI) or machine learning (ML) could be utilized to calculate the value of the first speed of sound. In an example, AI or ML could be utilized if actual measured values are unavailable.

At block 506, a second speed of sound is measured. The second speed of sound may be measured in a dual-gas supply flowing through the customer's gas meter. In an example, the dual-gas flow is a mixture of natural gas and hydrogen gas. In the example of block 508, the second speed of sound is measured at a metering device that is downstream from one or more hydrogen gas injection points. This may be the metering device of the customer discussed with respect to block 502. The speed of sound is measured in the dual-gas mixture metered by a metrology device of the metering device.

At block 510, a hydrogen concentration is calculated. In an example, the calculation is based at least in part on inputs including the value for the first speed of sound (e.g., sound through a single gas) and the value for the second speed of sound (e.g., sound through a dual-gas mixture). FIG. 6 describes example techniques for this calculation.

At block 512, a flowrate of hydrogen gas from an electrolysis system may be adjusted. The adjustment may be based on the hydrogen gas concentration calculated at block 510. The adjustment may be made to keep the hydrogen concentration within a particular range. Alternatively or additionally, the adjustment may be made based at least in part on a flowrate of gas at the hydrogen injection point.

FIG. 6 shows an example method 600 by which the calculation of a hydrogen concentration may be performed. Accordingly, FIG. 6 shows an example implementation of block 510 of FIG. 5, wherein the hydrogen concentration is calculated.

At block 602, a relative speed of sound is calculated. The calculation may be based on the first speed of sound and the second speed of sound. Block 604 provides an example of a technical method by which block 602 may be calculated. In block 604, the relative speed of sound may be calculated as a quotient of the first speed of sound divided by the second speed of sound. Thus, the relative speed of sound equals the speed of sound of the reference gas (i.e., the speed of sound within a single gas environment, e.g., natural gas) divided by the speed of sound measured at the meter (i.e., the speed of sound within a dual-gas environment, natural gas and hydrogen gas). The numerator and denominator may be reversed in some calculations to achieve similar results (assuming that a lookup table is configured for the reversed ratio). Additionally, alternative functions that produce a result using the two speeds of sound as inputs may also be used in the calculation of block 602.

Blocks 606 and 608 are alternative techniques to utilize the relative speed of sound to determine the hydrogen concentration. In the examples, the relative speed of sound is mapped to a value for the hydrogen concentration. FIG. 4 shows one example of such a mapping of the relative speed of sound to the hydrogen concentration.

At block 606, a lookup table may be used to map the relative speed of sound to the hydrogen concentration. In the alternative of block 608, a formula or function may be used to map the relative speed of sound to the hydrogen concentration.

Example Lookup Tables

In an example, a lookup table can be used to translate the "relative speed of sound" into a value of hydrogen gas within the dual-gas mixture. Herein, the relative speed of sound may be defined broadly to include values based at least in part on (e.g., the output of a function of) the two speeds of sound (e.g., the speed of sound through natural gas and speed of sound through a mixture of natural gas and hydrogen gas).

In some examples, the lookup table may be based on a model of the behavior of the gas or gas mixture, which may be based at least in part on an "Equation of State" of the gas. In an example of such a model, the "Ideal Gas" equation may be used.

In a more complex (and potentially more accurate) method to map the relative speed of sound to the hydrogen percentage, a plurality of lookup tables may be configured. Each lookup table within the plurality of lookup tables may be associated with a temperature (or a temperature range) and/or a pressure (or a pressure range).

Accordingly, the temperature and/or pressure of the gas would be considered with selecting a lookup table, and the lookup table would be consulted to translate the relative speed of sound into the percentage of hydrogen within the dual-gas mixture (e.g., natural gas mixed with hydrogen gas). The temperature and/or pressure of the gas could be considered at one or both locations wherein the two speed of sound measurements were made. In an example, the two temperatures and the two pressures could be used (i.e., four input values) to select a lookup table. In a further example, an average of the two temperatures and an average of the two pressures (i.e., two input values) could be used to select a lookup table. Lookup tables could be created by experimentation and/or calculation, etc.

FIG. 7 shows an example method 700 by which a lookup table can be selected. Accordingly, the techniques described show an example by which block 606 may be performed and a lookup table selected. The selected lookup table translates the relative speed of sound into a hydrogen gas concentration, based at least in part on the temperature and/or the pressure of the gas in the metering device(s) wherein the speeds of sound were measured.

At block 702, at least one of a gas temperature value and/or a gas pressure value is obtained. The actual measurement may be made at a location upstream from the customer and upstream from the injection point of hydrogen gas. Accordingly, the temperature and/or pressure measurements may be made of a natural gas flow.

At block 704, at least one of a gas temperature value and/or a gas pressure value is obtained or measured, such as at a customer's gas meter. The actual measurement may be made at a location of the customer and downstream from the injection point of hydrogen gas. Accordingly, the temperature and/or pressure measurements may be made of a mixture of natural gas and hydrogen gas.

At block 706, a lookup table is selected based at least in part on the temperatures and/or the pressures of the two gas flows (natural gas alone and a mixture of natural gas and hydrogen gas). The lookup table will map the relative speed of sound to the hydrogen gas concentration. The selection of the lookup table reflects the fact that gas pressure and gas temperature affect the speed of sound. Typically, the pressure of the natural gas flow, being upstream from the mixture of natural gas and hydrogen gas, will be of higher pressure. Similarly, expansion of the gas as it flows may cool it.

Figure 8:
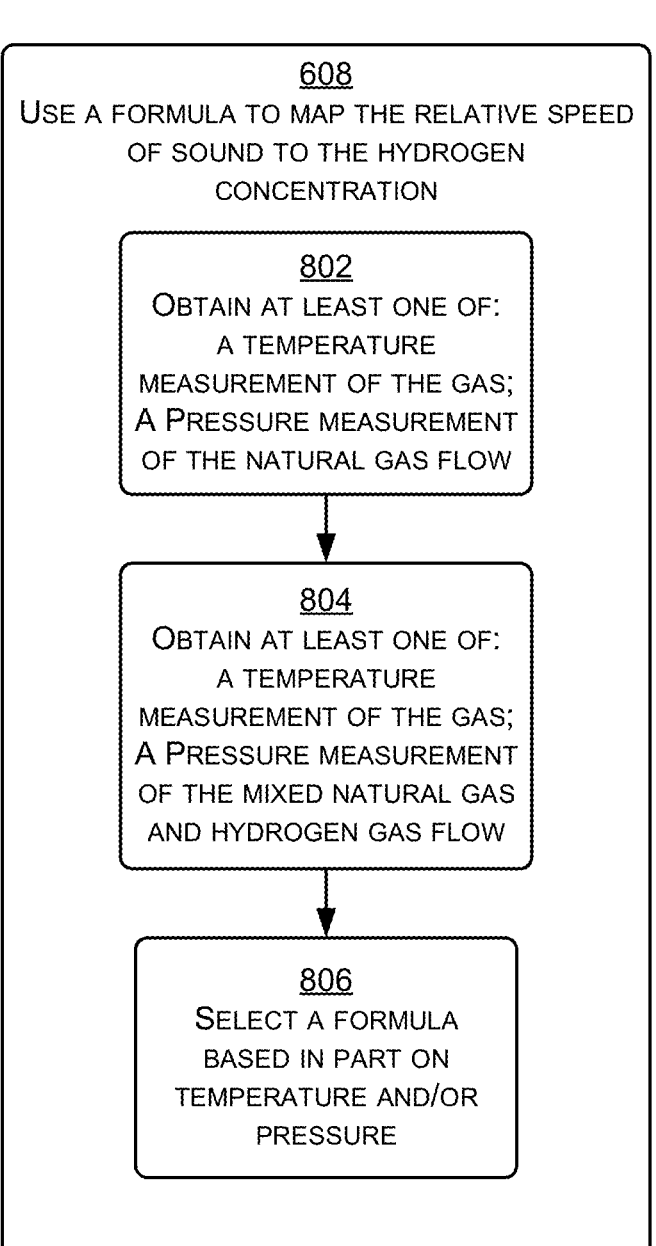
FIG. 8 is a flow diagram showing an example method by which a formula can be selected.

FIG. 8 shows an example method 800 by which a formula or function can be selected. Accordingly, the techniques described show an example by which block 608 may be performed and a function and/or a formula selected. The selected formula translates the relative speed of sound into a hydrogen gas concentration, based at least in part on the temperature and/or the pressure of the gas in the metering device. Blocks 802 and 804 are similar to blocks 702 and 704, respectively. At block 806, a formula is selected based in part on temperature and/or pressure. The selected formula or function translates the relative speed of sound into a hydrogen gas concentration, based at least in part on the temperature and/or the pressure of the gas in the metering device(s) wherein the speeds of sound were measured.

Example Systems and Devices

The following examples of a dual-gas metering system and method are expressed as numbered clauses. While the examples illustrate a number of possible configurations and techniques, they are not meant to be an exhaustive listing of the systems, methods, and/or techniques described herein.

1. A method of determining hydrogen concentrations in a gas delivery system, comprising: obtaining a first speed of sound of a single gas supply; measuring a second speed of sound of a dual-gas supply; and calculating a hydrogen gas concentration based at least in part on the first speed of sound and the second speed of sound.

2. The method of clause 1, wherein calculating the hydrogen gas concentration comprises: calculating a relative speed of sound, based on the first speed of sound and the second speed of sound; and calculating the hydrogen gas concentration based on the relative speed of sound.

3. The method of clause 2, wherein calculating the relative speed of sound comprises: calculating the relative speed of sound as a quotient of the first speed of sound and the second speed of sound.

4. The method of clause 2, wherein calculating the hydrogen gas concentration comprises: using a lookup table to map the relative speed of sound to the hydrogen gas concentration.

5. The method of clause 2, wherein calculating the hydrogen gas concentration comprises: using a formula to map the relative speed of sound to the hydrogen gas concentration.

6. The method of clause 1, wherein obtaining the first speed of sound comprises: obtaining the first speed of sound from a device that is upstream from one or more hydrogen gas injection points.

7. The method of clause 1, wherein measuring the second speed of sound comprises: measuring the second speed of sound at a metering device that is downstream from one or more hydrogen gas injection points.

8. The method as recited in clause 1, may additionally comprise one or more of, or any combination of, or all of, any of the preceding clauses.

9. A gas metering device, comprising: a metrology unit; a sound-speed measuring device; a memory device; and a processor, in communication with the metrology unit, the sound-speed measuring device, and the memory device, wherein the processor is configured to execute statements defined on the memory device to perform actions comprising: obtaining a first speed of sound of a single gas supply; measuring a second speed of sound of a dual-gas supply; and calculating a hydrogen gas concentration based at least in part on the first speed of sound and the second speed of sound, wherein an energy value of gas measured by the metrology unit is adjusted based at least in part on the hydrogen gas concentration.

10. The gas metering device of clause 9, wherein calculating the hydrogen gas concentration comprises: calculating a relative speed of sound, based on the first speed of sound and the second speed of sound; and calculating the hydrogen gas concentration based on the relative speed of sound.

11. The gas metering device of clause 10, wherein calculating the relative speed of sound comprises: calculating the relative speed of sound as a quotient of the first speed of sound and the second speed of sound.

12. The gas metering device of clause 10, wherein calculating the hydrogen gas concentration comprises: using a lookup table to map the relative speed of sound to the hydrogen gas concentration.

13. The gas metering device of clause 10, wherein calculating the hydrogen gas concentration comprises: using a formula to map the relative speed of sound to the hydrogen gas concentration.

14. The gas metering device of clause 10, wherein obtaining the first speed of sound comprises: obtaining the first speed of sound from a device that is upstream from one or more hydrogen gas injection points.

15. The gas metering device of clause 10, wherein measuring the second speed of sound comprises: measuring the second speed of sound at a metering device that is downstream from one or more hydrogen gas injection points.

16. The gas metering device as recited in clause 10, may additionally comprise one or more of, or any combination of, or all of, any of the preceding clauses.

17. One or more non-transitory computer-readable media storing computer-executable instructions that, when executed by one or more processors, configure a computing device to perform actions comprising: obtaining a first speed of sound of a single gas supply; measuring a second speed of sound of a dual-gas supply; and calculating a hydrogen gas concentration based at least in part on the first speed of sound and the second speed of sound.

18. One or more non-transitory computer-readable media as recited in clause 17, wherein calculating the hydrogen gas concentration comprises: calculating a relative speed of sound, based on the first speed of sound and the second speed of sound; and calculating the hydrogen gas concentration based on the relative speed of sound.

19. One or more non-transitory computer-readable media as recited in clause 18, wherein calculating the relative speed of sound comprises: calculating the relative speed of sound as a quotient of the first speed of sound and the second speed of sound.

20. One or more non-transitory computer-readable media as recited in clause 18, wherein calculating the hydrogen gas concentration comprises: using a lookup table to map the relative speed of sound to the hydrogen gas concentration.

21. One or more non-transitory computer-readable media as recited in clause 17, wherein obtaining the first speed of sound comprises: obtaining the first speed of sound from a device that is upstream from one or more hydrogen gas injection points.

22. One or more non-transitory computer-readable media as recited in clause 17, wherein measuring the second speed of sound comprises: measuring the second speed of sound at a metering device that is downstream from one or more hydrogen gas injection points.

23. One or more non-transitory computer-readable media as recited in in clause 17, may additionally comprise one or more of, or any combination of, or all of, any of the preceding clauses.

CONCLUSION

Although the subject matter has been described in language specific to structural features and/or methodological actions, it is to be understood that the subject matter defined in the appended claims is not necessarily limited to the specific features or actions described. Rather, the specific features and actions are disclosed as exemplary forms of implementing the claims.

The words comprise, comprises, and/or comprising, when used in this specification and/or claims do not preclude the presence or addition of one or more other features, devices, techniques, and/or components and/or groups thereof.

The invention claimed is:

1. A method of determining hydrogen concentrations in a gas meter, comprising:
   receiving, by operation of the gas meter, a flow of a dual-gas, wherein the gas meter is downstream from a hydrogen injection site;
   receiving, by operation of the gas meter, a first speed of sound within gas upstream from the hydrogen injection site;
   measuring, by operation of the gas meter, a second speed of sound within the dual-gas supply;
   calculating, by operation of the gas meter, a ratio of the first speed of sound and the second speed of sound; and
   calculating, by operation of the gas meter, a hydrogen gas concentration at the gas meter based at least in part on the ratio.

2. The method of claim 1, wherein calculating the hydrogen gas concentration comprises:
   using a lookup table to map the ratio to the hydrogen gas concentration.

3. The method of claim 1, wherein calculating the hydrogen gas concentration comprises:
   using a formula to map the ratio to the hydrogen gas concentration.

4. The method of claim 1, wherein the dual-gas comprises natural gas and hydrogen gas.

5. The method of claim 1, wherein the first speed of sound is a speed of sound within natural gas, and wherein the natural gas comprises one or more of:

methane;

propane, and butane.

6. The method of claim 1, additionally comprising:

calculating an energy value of the flow of the dual-gas metered by the gas meter, wherein the calculating is based at least in part on the hydrogen gas concentration.

7. A gas metering device, comprising:

a metrology unit;

a sound-speed measuring device;

a memory device; and a processor, in communication with the metrology unit, the sound-speed measuring device, and the memory device, wherein the processor is configured to execute statements defined on the memory device to perform actions comprising:

receiving a flow of a dual-gas, wherein the gas metering device is downstream from a hydrogen injection site;

receiving a first speed of sound within gas upstream from the hydrogen injection site;

measuring a second speed of sound within the dual-gas;

calculating a ratio of the first speed of sound and the second speed of sound; and calculating a hydrogen gas concentration based at least in part on the first ratio.

8. The gas metering device of claim 7, wherein calculating the hydrogen gas concentration comprises:

using a lookup table to map the ratio to the hydrogen gas concentration.

9. The gas metering device of claim 7, wherein calculating the hydrogen gas concentration comprises:

using a formula to map the ratio to the hydrogen gas concentration.

10. The gas metering device of claim 7, wherein the dual-gas comprises natural gas and hydrogen gas.

11. The gas metering device of claim 7, wherein the first speed of sound is a speed of sound within natural gas, and wherein the natural gas comprises one or more of:

methane;

propane, and butane.

12. The gas metering device of claim 7, wherein an energy value of gas measured by the metrology unit is adjusted based at least in part on the hydrogen gas concentration.

13. One or more non-transitory computer-readable media storing computer-executable instructions that, when executed by one or more processors, configure a computing device to perform actions comprising:

receiving, by operation of a gas meter, a flow of a dual-gas, wherein the gas meter is downstream from a hydrogen injection site;

receiving, by operation of the gas meter, a first speed of sound within gas upstream from the hydrogen injection site;

measuring, by operation of the gas meter, a second speed of sound within the dual-gas;

calculating, by operation of the gas meter, a ratio of the first speed of sound and the second speed of sound; and calculating, by operation of the gas meter, a hydrogen gas concentration at the gas meter based at least in part on the ratio.

14. One or more non-transitory computer-readable media as recited in claim 13, wherein calculating the hydrogen gas concentration comprises:

using a lookup table to map the ratio to the hydrogen gas concentration.

15. One or more non-transitory computer-readable media as recited in claim 13, wherein calculating the hydrogen gas concentration comprises:

using a formula to map the ratio to the hydrogen gas concentration.

16. One or more non-transitory computer-readable media as recited in claim 13, wherein the dual-gas comprises natural gas and hydrogen gas.

17. One or more non-transitory computer-readable media as recited in claim 13, wherein the first speed of sound is a speed of sound within natural gas, and wherein the natural gas comprises one or more of:

methane;

propane, and butane.

18. One or more non-transitory computer-readable media as recited in claim 13, wherein the actions additionally comprise:

calculating an energy value of the flow of the dual-gas metered by the gas meter, wherein the calculating is based at least in part on the hydrogen gas concentration.

* * * * *